United States Patent [19]

Ebata et al.

[11] Patent Number: 4,857,486

[45] Date of Patent: Aug. 15, 1989

[54] ADHESIVE FOR OXIDE CERAMICS AND METHOD OF BONDING OXIDE CERAMICS USING IT

[75] Inventors: Yoshihiro Ebata, Kawanishi; Masanori Kouyama; Nobuyuki Tamari, both of Ikeda; Takamichi Kawamoto, Ashiya, all of Japan

[73] Assignee: Japan as represented by Director General of Agency of Industrial Science and Technology, Tokyo, Japan

[21] Appl. No.: 199,410

[22] PCT Filed: Mar. 31, 1987

[86] PCT No.: PCT/JP87/00200

§ 371 Date: May 12, 1988

§ 102(e) Date: May 12, 1988

[87] PCT Pub. No.: WO88/01987

PCT Pub. Date: Mar. 4, 1988

[30] Foreign Application Priority Data

Sep. 22, 1986 [JP] Japan .................. 61-224661

[51] Int. Cl.$^4$ ............... C03C 8/22; C03C 8/02
[52] U.S. Cl. ........................ 501/21; 501/7; 501/11; 501/15; 501/16; 501/24; 501/26; 501/32; 501/45; 501/47; 501/48; 501/65
[58] Field of Search .......... 501/15, 16, 7, 11, 24, 501/45, 47, 48, 26, 65, 32

[56] References Cited

U.S. PATENT DOCUMENTS

| | | | |
|---|---|---|---|
| 3,473,999 | 10/1969 | Muchon | 501/15 |
| 3,499,773 | 3/1970 | Petticrew | 501/7 |
| 3,561,984 | 2/1971 | Eppler | 501/7 |
| 3,776,764 | 12/1973 | Takagi et al. | 501/15 |
| 3,907,535 | 9/1975 | Muller | 501/15 |
| 3,954,486 | 5/1976 | Francel | 501/15 |
| 4,365,021 | 12/1982 | Pirooz | 501/15 |
| 4,435,511 | 3/1984 | Weaver | 501/22 |
| 4,743,302 | 5/1988 | Dunaesnil et al. | 501/32 |
| 4,748,136 | 5/1988 | Mahulikar et al. | 501/32 |

FOREIGN PATENT DOCUMENTS

| | | | |
|---|---|---|---|
| 3343570 | 6/1984 | Fed. Rep. of Germany | 501/15 |
| 1446927 | 6/1966 | France | 501/16 |
| 56-120538 | 9/1981 | Japan | 501/15 |
| 58-213682 | 12/1983 | Japan | 501/15 |
| 59-164649 | 9/1984 | Japan | 501/15 |

*Primary Examiner*—William R. Dixon, Jr.
*Assistant Examiner*—Susan Hollenbeck
*Attorney, Agent, or Firm*—Armstrong, Nikaido, Marmelstein, Kubovcik & Murray

[57] ABSTRACT

Disclosed are an adhesive for oxide ceramics, which comprises as its effective ingredient a crystallized glass mainly comprising $SiO_2$, $Al_2O_3$, $Li_2O$, $MgO$ and/or $ZnO$, and $TiO_2$ and/or $ZrO_2$, and also a method of bonding oxide ceramics together, which comprises heating oxide ceramics to be bonded together at 1200° to 1600° C. with the adhesive placed between the ceramics.

5 Claims, No Drawings

ADHESIVE FOR OXIDE CERAMICS AND METHOD OF BONDING OXIDE CERAMICS USING IT

DESCRIPTION

1. Field of Art

The present invention relates to an adhesive for oxide ceramics and a method of bonding oxide ceramics using the adhesive. More particularly, the invention relates to a novel adhesive for oxide ceramics which can easily and extremely firmly bond oxide ceramics including monocrystalline ceramics of such as alumina, magnesia and so forth, and also to a method of bonding oxide ceramics with use of the adhesive.

2. Background Art

Oxide ceramics have attracted attention as material generally having remarkable mechanical strength and heat resistance at high temperatures, and there have been progressively made applications and developments using such material.

In order to let oxide ceramics fully exhibit their characteristics in the manufacture of various machines or parts thereof with use of the oxide ceramics, it is necessary to effect a mutual bonding of oxide ceramics in the process of the manufacture.

However, there are limitations to do with molding and/or processing of oxide ceramics, so that to fabricate a member having a complex configuration with parts which are molded in a simple configuration, it is indispensable to develop an effective technique for mutually bonding oxide ceramics.

Thus, conventionally it has been practiced for the method of mutually bonding oxide ceramis to operate a hot press at a high temperature and under a high pressure, with or without an adhesive applied between the adherends.

However, according to hot-press methods, the processing has to be carried out at a high temperature and under a high pressure, so that an extreme difficulty is involved in bonding together such members as having a complex configuration or having different configurations from each other.

A same as above is indicated in connection with the HIP method (hot isostatic pressing method), a method which has of late been put for studies.

Thus, there has been a demand for developing an adhesive with which mutual bonding of materials which are large in size and have a complex configuration can be easily made simply by heating and without the need of a particular pressure application.

In this connection, hitherto known adhesives for oxide ceramics and methods of bonding oxide ceramics may be exemplified by the following.

(a) an adhesive for ceramics comprising as its effective ingredient at least one member selected from the group consisting of sodium fluorides and calcium fluorides or a mixture thereof with kaolin, and a bonding method using the adhesive (Japanese patent publication No. 59-25754)

(b) an adhesive for ceramics comprising as its effective ingredient a mixture of at least one member selected from the group consisting of alkali metal fluorides and alkaline earth metal fluorides with at least one member selected from oxides of lanthanide elements, and a bonding method using the adhesive (Japanese patent publication No. 60-18627)

(c) an adhesive for ceramics comprising as its effective ingredient at least one member selected from the group consisting of alkali metal fluorides and alkaline earth metal fluorides or a mixture thereof with kaolin, and a bonding method using the adhesive (Japanese patent publication No. 61-16751)

(d) a method of bonding ceramics comprising fusing oxide ceramics such as $MgO$-$Al_2O_3$-$SiO_2$ ceramics and $MgO$-$Al_2O_3$-$TiO_2$ ceramics with a glass containing respective specified amounts of $MgO$, $Al_2O_3$, $SiO_2$, $BaO$ and $ZrO_2$, and converting the resulting glass to a crystallized glass (Japanese patent application Kokai publication No. 57-47777)

However, the adhesive strength of each of the above adhesives (a) to (c), which is on the order of 20 to 30 $kg/mm^2$, is not necessarily sufficient depending on the specific utility of the oxide ceramics, and a particular difficulty with these adhesives resides in that with use thereof it is impossible to bond monocrystalline oxide ceramics of such as for example alumina, magnesia and so forth.

A shortcoming of the above bonding method (d) resides in that the adhesive strength obtainable according to this method is so low that the method is not much useful practically.

DISCLOSURE OF THE INVENTION

A first object of the present invention is to provide an adhesive and a bonding method with and by which it is feasible to firmly bond oxide ceramics through extremely simple procedures.

A second object of the invention is to provide an adhesive and a bonding method with and by which it is feasible to firmly bond even monocrystalline oxide ceramics of such as alumina, magnesia and so forth.

A third object of the invention is to provide an adhesive for oxide ceramics and a bonding method with and by which it is feasible to impart remarkable chemical resistance and thermal shock resistance to the adhesive layer in bonded oxide ceramics.

The above objects of the present invention are attained by providing, according to the present invention, an adhesive for oxide ceramics which comprises as its effective ingredient a crystallized glass mainly comprising $SiO_2$, $Al_2O_3$, $Li_2O$, $MgO$ and/or $ZnO$, and $TiO_2$ and/or $ZrO_2$.

Also, it is feasible to firmly bond oxide ceramics with ease by interposing the adhesive between oxide ceramics to be bonded together, and heating the ceramics at 1200° to 1600° C.

BEST MODE FOR CARRYING OUT THE INVENTION

The adhesive for oxide ceramics according to the present invention comprises as its effective ingredient a crystallized glass of a specific composition.

The crystallized glass termed herein means such a one which mainly comprises 60 to 70 wt. % of $SiO_2$, 19 to 23 wt. % of $Al_2O_3$, 2 to 6 wt. % of $Li_2O$, 1 to 8 wt. % of $MgO$ and/or $ZnO$ and 3 to 5 wt. % of $TiO_2$ and/or $ZrO_2$.

Such crystallized glass can be produced by altogether mixing the raw materials comprising the above respective components (having a particle diameter normally of about 50μ) and melting the resulting mixture for about two hours at a temperature in the vicinity of 1500° C. After completion of the melting, further, the melt is molded into a plate or sheet, which is heated again for about 1 hour at a temperature in the vicinity of 1200° C.

Among the above components of the crystallized glass, $TiO_2$ and $ZrO_2$ function as nucleating agent in the crystallization concerned, and by making use of these substances, the crystallization can be caused to take place more effectively.

Further, it is possible to suitably let the crystallized glass contain up to about 2 wt. % of at least one member selected from the group consisting of $P_2O_5$, $Na_2O$, $K_2O$, BaO and CaO.

Moreover, according to the present invention, a co-use with the crystallized glass may be made of $P_2O_5$-based glass, PbO-based glass, ZnO-based glass or hard borosilicate glass as low-melting glass.

The low-melting glass such as above has a function to lower the melting point of the crystallized glass and, in addition, functions to improve the wettability and enhance the adhesive strength of the crystallized glass and to adjust the thermal expansion coefficient of the adhesive layer to enhance the thermal shock resistance of the bonded product.

The low-melting glass, too, can be produced according to a customary method of production, for example by mixing the raw materials comprising the respective components (having a particle diameter normally of about 50μ) and melting the resulting mixture at 1200° C. for about 1 hour. After completion of the melting, further, the resulting glass is flowed out, cooled and then crushed.

For the low-melting glass for purposes of the present invention, use is preferably made of $P_2O_5$-based glass mainly comprising 50 to 75 wt. % of $P_2O_5$ and 15 to 20 wt. % of $Al_2O_3$. Besides that glass, such as a PbO-based glass mainly comprising 60 to 90 wt. % of PbO and 5 to 15 wt. % of $B_2O_3$, a ZnO-based low-melting glass mainly comprising 60 to 70 wt. % of ZnO and 20 to 25 wt. % of $B_2O_3$ and a hard borosilicate glass comprising 70 to 85 wt. % of $SiO_2$, 5 to 15 wt. % of $Na_2O$ and so forth are also satisfactorily useful, even though with those glass the adhesive strength obtainable tends to be slightly lower.

The following Table 1 shows examples of the composition of the low-melting glass.

TABLE 1

| Composition Examples of $P_2O_5$-Based Low-Melting Glass | | |
| --- | --- | --- |
| | (1) | (2) |
| $P_2O_5$ | 72 wt. % | 68.2 wt. % |
| $Al_2O_3$ | 18 wt. % | 16.4 wt. % |
| ZnO | 10 wt. % | 13.1 wt. % |
| $SiO_2$ | — | 2.0 wt. % |

| Composition Examples of PbO-Based Low-Melting Glass | | | |
| --- | --- | --- | --- |
| | (1) | (2) | (3) |
| PbO | 64.1 wt. % | 72 wt. % | 85 wt. % |
| $B_2O_3$ | 11.9 wt. % | 18 wt. % | 7.5 wt. % |
| $SiO_2$ | 5 wt. % | 2.5 wt. % | 7.5 wt. % |
| ZnO | 19.0 wt. % | 5.0 wt. % | — |
| $Al_2O_3$ | — | 2.5 wt. % | — |

| Composition Examples of ZnO-Based Low-Melting Glass | | |
| --- | --- | --- |
| | (1) | (2) |
| ZnO | 65 wt. % | 65 wt. % |
| $B_2O_3$ | 22.5 wt. % | 23 wt. % |
| $SiO_2$ | 12.5 wt. % | 10 wt. % |

| Composition Examples of Hard Borosilicate Glass | | |
| --- | --- | --- |
| | (1) | (2) | (3) |
| $SiO_2$ | 71.0 wt. % | 72.0 wt. % | 80 wt. % |
| $B_2O_3$ | 7.3 wt. % | 3.1 wt. % | 12 wt. % |
| $Al_2O_3$ | 4.1 wt. % | 4.2 wt. % | 3 wt. % |
| $Na_2O$ | 11.0 wt. % | 7.9 wt. % | 5 wt. % |
| $K_2O$ | 3.3 wt. % | 3.4 wt. % | — |
| $Fe_2O_3$ | 0.2 wt. % | 0.2 wt. % | — |
| CaO | 0.6 wt. % | 0.2 wt. % | — |
| MgO | 0.1 wt. % | 0.5 wt. % | — |
| MnO | 0.1 wt. % | 0.1 wt. % | — |
| ZnO | 2.3 wt. % | 7.0 wt. % | — |
| $As_2O_3$ | — | — | 0.4 wt. % |

Notes:
(1) composition for beakers
(2) composition for flasks
(3) composition for physiochemical appliances The above crystallized glass and low-melting glass are each used in the form of powder, the particle diameter of which should preferably be up to 3 μm.

Also, the crystallized glass and low-melting glass are used in a proportion normally of 50 to 30 wt. % of the low-melting glass to 50 to 70 wt. % of the crystallized glass, and in a proportion outside this range, the adhesive strength obtainable tends to lower.

The adhesive according to the present invention may be used in any of the form of powder of the crystallized glass, the form of a powder mixture of the crystallized glass and the low-melting glass, the form of pellets suitably formed of the glass and the form of paste prepared by blending to powder or powder mixture of the glass an appropriate amount of a binder, for example an organic binder such as balsam and screen oil, or an organic solvent.

To apply the adhesive according to the present invention between oxide ceramics to be bonded together, any of various methods may be selectively operated depending on the condition of the adhesive. For example, where it is in the form of powder, the adhesive can be applied by disseminating it on the adherend surface, where it is in the form of pellets, the adhesive can be sandwiched between the adherend surfaces, and where it is in the form of paste, the adhesive can be applied by coating it on the adherend surface as in the cases of ordinary adhesives.

The amount of the adhesive to be interposed between adherends by dissemination, sandwiching or coating is not particularly limited and can be suitably determined depending on the composition of the adhesive, the condition of heating after the adhesive is interposed between adherends, the configurations, particularly the thicknesses, of oxide ceramics to be bonded together. However, suitably it normally is 0.01 to 1 g or, more preferably, 0.05 to 0.3 g per $cm^2$ of the adherend surface area, in terms of the weight of the effective ingredient of the adhesive of the invention, namely the crystallized glass.

According to the method of mutually bonding oxide ceramics according to the invention, the above described adhesive is interposed between oxide ceramics to be bonded together and the ceramics are then heated.

The heating temperature should necessarily be within a range of 1200° to 1600° C., and in practice, a heating temperature is appropriately determined depending on the melting point of the crystallized glass within the above range, the composition of the adhesive and so forth.

At a heating temperature below 1200° C., the crystallized glass cannot be sufficiently melted and almost no bonding effect can be exhibited, while at a heating temperature above 1600° C., it tends to occur that melted glass is permitted to flow out in peripheral portions around the bonding area on the ceramics.

Although a suitable heating time may vary depending on the heating temperature, the configuration of ceramics and so on, it normally is on the order of 20 to 60 minutes.

The heating may be operated in either of an oxidizing atmosphere and a non-oxidizing atmosphere, including for example in air, in vacuo and in an inert gas.

Further, it is unnecessary to use any means for pressure application in operating the heating, but in order to ensure a closely contacting condition of surfaces to be bonded together, it may preferably be operated to apply an appreciable degree of pressure.

By the above heating treatment, the adhesive placed between oxide ceramics to be bonded together can undergo melt adhesion and the ceramics can be firmly bonded to each other.

According to what the inventors of the present invention have ascertained, a particularly high adhesive strength is obtainable when a portion of crystals of the crystallized glass remains present in the adhesive layer subsequent to the heating treatment, while the adhesive strength obtainable tends to be lower if such crystals are dissipated.

Therefore, preferably the heating temperature, the heating time and so forth are so adjusted as to obtain such a condition in which a portion of the crystals remains present in the layer of the adhesive.

No particular limitation applies to oxide ceramics which can be mutually bonded by the adhesive of the present invention, and they include ceramics of such as for example monocrystalline alumina and magnesia, and ceramics of such as polycrystalline alumina, magnesia, zirconia, cordierite and mullite.

Also, the oxide ceramics may be in any of the forms of hot-press moldates, atmospheric sintered products and monocrystalline products, and their configurations and sizes are not particularly limited. The oxide ceramics may be any of a cube, a rectangular solid, a sphere, a column and a cylinder or of a complex configuraton comprising a combination of the above or any other complex configuration.

As described above, the adhesive for oxide ceramics according to the present invention comprises an appropriate combination of metal oxides of particular compositions and no particular chemical is used in the adhesive, so that the adhesive can be produced with ease and at a low cost.

Further, according to the method of mutually bonding oxide ceramics according to the invention, only by the extremely simple steps of letting the adhesive be interposed between oxide ceramics to be bonded together and of then heating the ceramics, the oxide ceramics can be bonded firmly, that is to say, normally at a high adhesive strength about twice as great as the conventionally obtained adhesive strength or at least about 45 kg/mm$^2$.

Particularly, even monocrystalline ceramics bonding of which is almost impossible with conventional adhesives can be same firmly bonded as above.

Moreover, an adhesive layer having a high degree of transparency is obtainable. Particularly, monocrystals in the layer not only have an optical clarity but also exhibit a high bonding strength, so that the adhesive can advantageously bond various articles to one another such as alumina, magnesia and so forth.

Mutually bonded oxide ceramics have a remakable chemical resistance and, when kept immersed in a 48% aqueous solution of KOH at 70° C. for 50 hours, undergo no change, and they can exhibit a high adhesive strength at a high temperature of for example 600° C. Thus, the adhesive of the present invention is highly suitable for the bonding of members for use under a high temperature condition. The adhesive can of course bond ceramics of a complicated configuration with ease.

Further, the adhesive layer is possessed of a remarkable chemical resistance.

Also, it is feasible to adjust the thermal expansion coefficient of the adhesive layer by changing the blending amount of the low-melting glass, so that it can be made to enhance the thermal shock resistance of the adhesive layer.

Now, the present invention will be described in connection with examples.

EXAMPLE 1

Powder of the crystallized glass comprising the ingredients shown in the below Table 2 was mixed with powder of the low-melting glass comprising the ingredients shown in the below Table 3 in compounding ratios shown in Table 4 below, and with 160 mg of each of the resulting mixtures, 0.06 to 0.5 cc of screen oil was admixed to obtain paste products. Each of the paste products was interposed between two flat square aluminum plates (15 mm × 15 mm × 15 mm) and these plates were bonded to each other by heating at 1400° C. for 20 minutes.

Square bars of a size of 3 mm × 3 mm × 3 mm were sampled by cutting from each of the above obtained bonded aluminum plates, and each square bar sample was subjected to a three-point bending test at each of room temperature and a temperature of 600° C., under the conditions of a span of 20 mm and a rate of loading of 0.5 mm/min to find the adhesive strength, which was determined by taking an average of the values found of three sample bars.

Results of determinations are shown also in Table 4 below.

TABLE 2

| Glass Ingredients | Suitable Range (wt. %) | Optimal Condition (wt. %) |
|---|---|---|
| SiO | 62 to 70 | 62 |
| Al$_2$O$_3$ | 19 to 25 | 21 |
| Li$_2$O | 0 to 1.8 | 0.3 |
| MgO.ZnO | 1 to 7 | 1.7 |
| TiO$_2$.ZrO$_2$ | 3 to 4.7 | 2 |

TABLE 3

| Glass Ingredients | Suitable Range (wt. %) | Optimal Condition (wt. %) |
|---|---|---|
| P$_2$O$_5$ | 50 to 75 | 68 |
| Al$_2$O$_3$ | 15 to 18 | 16 |
| ZnO | 10 to 13 | 14 |
| SiO$_2$ | 0.5 to 25.0 | 2 |

TABLE 4

| | A | B | C | D |
|---|---|---|---|---|
| Crystallized Glass | 90 | 70 | 50 | 30 |
| Low-Melting Glass | 10 | 30 | 50 | 70 |
| Adhesive Strength (Room Temperature) (kg/mm$^2$) | 48 | 47 | 45 | 42 |

TABLE 4-continued

|  | A | B | C | D |
|---|---|---|---|---|
| Adhesive Strength (600° C.) (kg/mm) | 42 | 42 | 40 | 38 |

EXAMPLE 2

Powder of the crystallized glass comprising the ingredients shown in the above Table 2 was mixed with powder of the low-melting glass comprising the ingredients shown in the above Table 3 in compounding ratios shown in the above Table 4, and with 160 mg of each of the resulting mixtures, 0.06 to 0.5 cc of screen oil was admixed to obtain paste products. Each of the paste products was interposed between two flat square aluminum plates (15 mm × 15 mm × 15 mm) and these plates were bonded to each other by heating at 1400° C. for 20 minutes.

Square bars of a size of 3 mm × 3 mm × 3 mm were sampled by cutting from each of the above obtained bonded aluminum plates, and each square bar sample was subjected to a three-point bending test at each of room temperature and a temperature of 600° C., under the conditions of a span of 20 mm and a rate of loading of 0.5 mm/min to find the adhesive strength, which was determined by averaging the values found of three bar samples.

Results of the determinations are shown in Table 5 below.

Further, where PbO-based glass, ZnO-based glass and hard borosilicate glass were used each in place of the low-melting glass shown in the above Table 3, same test results as shown in Table 5 were obtained.

TABLE 5

|  | A | B | C | D |
|---|---|---|---|---|
| Crystallized Glass | 90 | 70 | 50 | 30 |
| Low-Melting Glass | 10 | 30 | 50 | 70 |
| Adhesive Strength (Room Temperature) (kg/mm²) | 45 | 46 | 38 | 40 |
| Adhesive Strength (600° C.) (kg/mm) | 45 | 44 | 36 | 38 |

Bonded oxide ceramics according to the present invention have the above described characteristics, so that the utility of oxide ceramics can be expanded, starting with utilities in optical fields.

EXAMPLE 3

With powder singly of the crystallized glass having ingredients shown in the above Table 2 and the composition shown in the below Table 6, 0.2 cc of screen oil was mixed to prepare paste, which was placed between two flat square aluminum plates (15 mm × 15 mm × 15 mm), and the plates were then heated at 1500° C. for 20 minutes.

Square bars of a size of 3 mm × 3 mm × 3 mm were sampled by cutting from the above obtained bonded plates, and each of the sample bars was subjected to a three-point bending test at each of room temperature and a temperature of 600° C., under the conditions of a span of 20 mm and a rate of loading of 0.5 mm/min to find the adhesive strength, which was determined by averaging the values found of three sample bars.

Results of the determinations are shown in Table 6 below.

TABLE 6

| Ingredients/Composition of Crystallized Glass | |
|---|---|
| $SiO_2$ | 62 wt. % |
| $Al_2O_3$ | 21 wt. % |
| $Li_2O$ | 0.3 wt. % |
| MgO.ZnO | 1.7 wt. % |
| $TiO_2.ZrO_2$ | 2 wt. % |
| Adhesive Strength (Room Temperature) | 44 kg/mm² |
| Adhesive Strength (600° C.) | 43 kg/mm² |

We claim:

1. An adhesive frit for oxide ceramics consisting essentially of 50 to 70 wt. % of a crystallized glass and 50 to 30 wt. % of a low-melting glass, wherein said crystallized glass comprises 60 to 70 wt. % of $SiO_2$, 19 to 23 wt. % of $Al_2O_3$, 2 to 6 wt. % of $Li_2O$, 1 to 8 wt. % of MgO and/or ZnO and 3 to 5 wt. % of $TiO_2$ and/or $ZrO_2$, and wherein said low-melting glass is a $P_2O_5$-based low-melting glass, a ZnO-based low-melting glass or a hard borosilicate glass.

2. An adhesive frit for oxide ceramics as set forth in claim 1, characterized in that said crystallized glass comprises as its auxiliary ingredient up to 2 wt. % of at least one member selected from the group consisting of $P_2O_5$, $Na_2O$, $K_2O$, BaO and CaO.

3. An adhesive frit for oxide ceramics as set forth in claim 1, characterized in that said $P_2O_5$-based low-melting glass mainly comprises 50 to 75 wt. % of $P_2O_5$ and 15 to 20 wt. % of $Al_2O_3$.

4. An adhesive frit for oxide ceramics as set forth in claim 1, characterized in that said ZnO-based low-melting glass mainly comprises 60 to 70 wt. % of ZnO and 20 to 25 wt. % of $B_2O_3$.

5. An adhesive frit for oxide ceramics as set forth in claim 1, characterized in that said hard borosilicate glass mainly comprises 70 to 85 wt. % of $SiO_2$ and 5 to 15 wt. % of $Na_2O$.

* * * * *